(12) United States Patent
Mukhtar et al.

(10) Patent No.: US 9,654,932 B1
(45) Date of Patent: May 16, 2017

(54) SYSTEMS AND METHODS FOR DETECTING MOBILE DEVICE MOVEMENT WITHIN A VEHICLE USING ACCELEROMETER DATA

(71) Applicant: Allstate Insurance Company, Northbrook, IL (US)

(72) Inventors: Yasir Mukhtar, Des Plaines, IL (US); Varun Nagpal, Chicago, IL (US); Jared S. Snyder, Chicago, IL (US); Connor Walsh, Lake Forest, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 15/263,562

(22) Filed: Sep. 13, 2016

(51) Int. Cl.
*H04W 4/02* (2009.01)
*G06F 17/16* (2006.01)
*G06F 17/18* (2006.01)
*G06Q 40/08* (2012.01)

(52) U.S. Cl.
CPC ............ *H04W 4/027* (2013.01); *G06F 17/16* (2013.01); *G06F 17/18* (2013.01); *G06Q 40/08* (2013.01); *H04W 4/026* (2013.01)

(58) Field of Classification Search
CPC ....... H04W 4/027; H04W 4/026; G06F 17/16; G06F 17/18; G06Q 40/08
See application file for complete search history.

(56) References Cited

U.S. PATENT DOCUMENTS

| 8,862,486 | B2 | 10/2014 | Cordova et al. |
| 9,127,946 | B1 * | 9/2015 | Menon ................... G06Q 40/08 |
| 2014/0180731 | A1 | 6/2014 | Cordova et al. |
| 2014/0266789 | A1 | 9/2014 | Matus |

(Continued)

FOREIGN PATENT DOCUMENTS

| WO | 2014058999 A1 | 4/2014 |
| WO | 2015187794 A1 | 12/2015 |

OTHER PUBLICATIONS

Chu, Hon Lung, "In-Vehicle Driver Detection Using Mobile Phone Sensors", Duke Electrical and Computer Engineering, published Apr. 20, 2011.

(Continued)

*Primary Examiner* — Kashif Siddiqui
(74) *Attorney, Agent, or Firm* — Banner & Witcoff, Ltd.

(57) ABSTRACT

One or more mobile device movement detection computing devices and methods are disclosed herein based on acceleration data collected from an accelerometer of a mobile device found within an interior of a vehicle. The mobile device movement detection computing devices may identify a likely mobile device movement event based on a change of angle between two three-dimensional acceleration vectors. Where the mobile device movement detection computing devices detect a likely mobile device movement event, sensor data from various sensors of a mobile device are collected and aggregated for a window of time encompassing the mobile device movement event. Data from vehicle sensors and other external systems may also be used. The mobile device movement detection computing devices calculate a risk score based on the aggregates sensor data, and provide feedback to a mobile device or vehicle based on the calculated risk score.

20 Claims, 6 Drawing Sheets

(56) References Cited

U.S. PATENT DOCUMENTS

2014/0278206 A1* 9/2014 Girod .................... G01C 15/00
                                                              702/141
2015/0019266 A1* 1/2015 Stempora ............... G06Q 40/08
                                                              705/4
2015/0120132 A1    4/2015 Kramer et al.
2016/0012486 A1    1/2016 Vartanian et al.
2016/0016590 A1    1/2016 Fernandez Pozo et al.
2016/0036964 A1    2/2016 Barfield, Jr. et al.
2016/0098868 A1    4/2016 Lambert et al.

OTHER PUBLICATIONS

Reininger, Michael et al., "A First Look at Vehicle Data Collection Via Smartphone Sensors", Sensors Applications Symposium (SAS), 2015 IEEE, Apr. 13, 2015, pp. 1-6.
Wang, Yan et al., "Sensing Vehicle Dynamics for Determining Driver Phone Use", MobiSys'13, Jun. 25-28, 2013, Taipei, Taiwan, copyright 2013.

* cited by examiner

SYSTEMS AND METHODS FOR DETECTING MOBILE DEVICE MOVEMENT WITHIN A VEHICLE USING ACCELEROMETER DATA

TECHNICAL FIELD

Aspects of the disclosure generally relate to the analysis of accelerometer data obtained from a mobile device within an interior of a vehicle. In particular, various aspects of the disclosure relate to receiving and transmitting accelerometer data, and analyzing the data to detect movement of the mobile device within the interior of the vehicle.

BACKGROUND

Insurance providers value the safety of drivers and the general public. Detecting likely movement of a mobile device within a vehicle and providing feedback to the drivers reduces distracted driving and promotes safety. Although techniques exist to generally capture data from sensors on smartphones and in vehicles, they might not provide accurate and power-efficient methods of detecting movement of a mobile device. Further, these techniques may not calculate a risk score based on the movement of a mobile device, or provide feedback on improving the risk score.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Advantageous solutions to the problems presented above, and other issues which will be apparent upon the reading of the present disclosure, may be to collect acceleration data from an accelerometer associated with a mobile device, where the mobile device is located within a vehicle. In some examples, the acceleration data may be collected at a first time and at a second time. Accordingly, the acceleration data may be processed to remove a gravity component and to generate a processed acceleration data at the first time and at the second time. The processed acceleration data may be used to determine that a mobile device movement event has occurred at the second time. Sensor data from other sensors associated with the mobile device, such as a GPS receiver and/or a gyroscope, may also be collected. The sensor data from the other sensors may be aggregated over a window of time starting at a predetermined duration before the second time and ending at predetermined duration after the second time. The aggregated sensor data may be used to calculate a risk score and to generate a notification with feedback to the mobile device.

In accordance with further aspects of the present disclosure, a method disclosed herein may include collecting acceleration data from an accelerometer associated with a mobile device, where the mobile device is located within a vehicle. In some examples, the acceleration data may be collected at a first time and at a second time. Accordingly, the acceleration data may be processed to remove a gravity component and to generate a processed acceleration data at the first time and at the second time. The processed acceleration data may be used to determine that a mobile device movement event has occurred at the second time. Sensor data from other sensors associated with the mobile device, such as a GPS receiver and/or a gyroscope, may also be collected. The sensor data from the other sensors may be aggregated over a window of time starting at a predetermined duration before the second time and ending at predetermined duration after the second time. The aggregated sensor data may be used to calculate a risk score and to generate a notification with feedback to the mobile device.

In accordance with further aspects of the present disclosure, a computer-assisted method of detecting mobile device movement events disclosed herein may include collecting acceleration data from an accelerometer associated with a mobile device, where the mobile device is located within a vehicle. In some examples, the acceleration data may be collected at a first time and at a second time. Accordingly, the acceleration data may be processed to remove a gravity component and to generate a processed acceleration data at the first time and at the second time. The processed acceleration data may be used to determine that a mobile device movement event has occurred at the second time. Sensor data from other sensors associated with the mobile device, such as a GPS receiver and/or a gyroscope, may also be collected. The sensor data from the other sensors may be aggregated over a window of time starting at a predetermined duration before the second time and ending at predetermined duration after the second time. The aggregated sensor data may be used to calculate a risk score and to generate a notification with feedback to the mobile device.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a specially-programmed computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
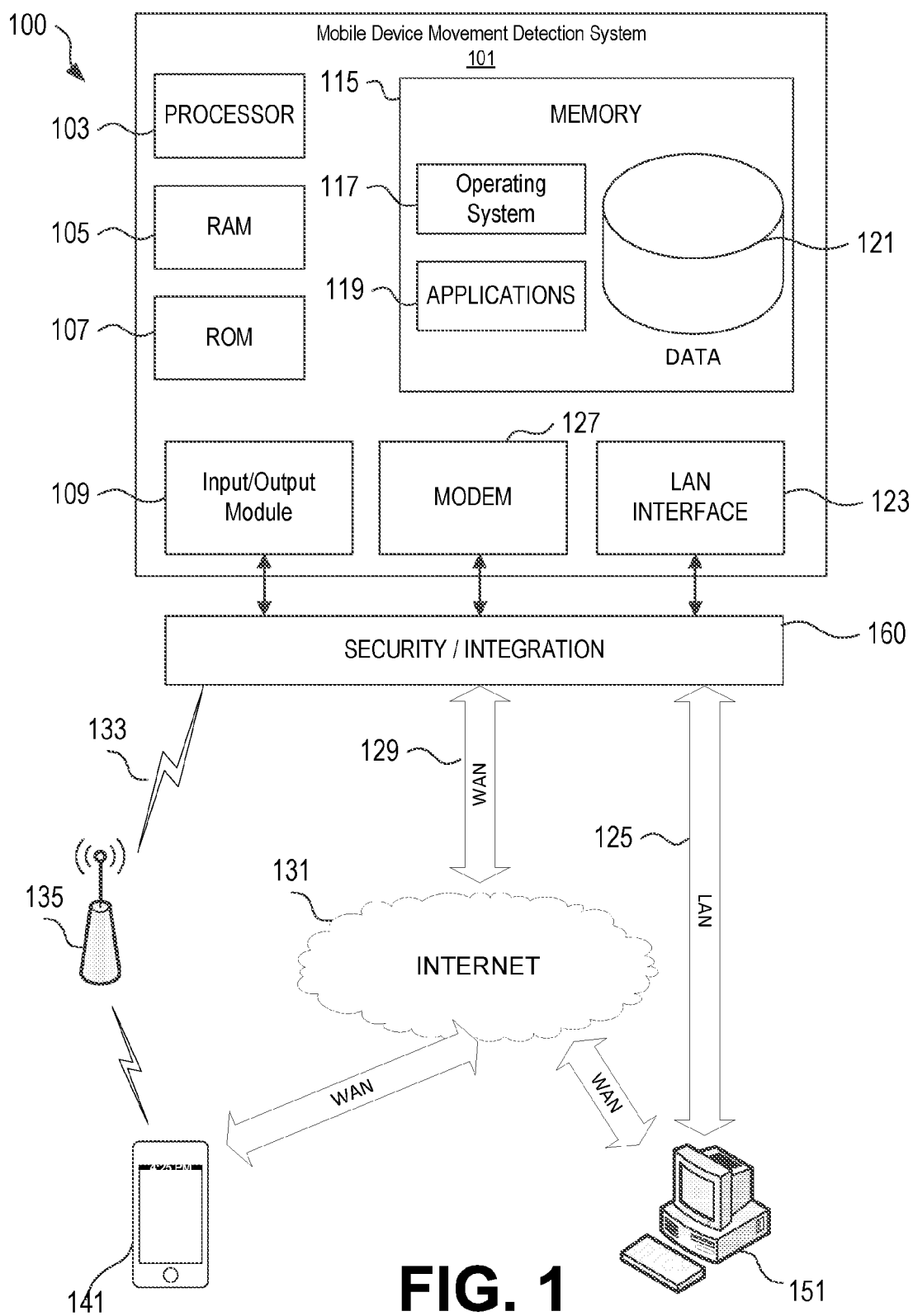
FIG. 1 illustrates a network environment and computing systems that may be used to implement aspects of the disclosure.

FIG. 1 illustrates a block diagram of a mobile device movement detection system 101 in a distracted driving analysis system 100 that may be used according to one or more illustrative embodiments of the disclosure. The mobile device movement detection system 101 may have a processor 103 for controlling overall operation of the mobile device movement detection system 101 and its associated components, including RAM 105, ROM 107, input/output module 109, and memory 115. The mobile device movement detection system 101, along with one or more additional devices (e.g., terminals 141, 151) may correspond to one or more special-purpose computing devices, such as distracted driving analysis computing devices or systems, including mobile computing devices (e.g., smartphones, smart terminals, tablets, and the like) and vehicular-based computing devices, configured as described herein for collecting and analyzing sensor data from mobile devices associated with vehicles, detecting mobile device movement events, determining a risk score, and providing feedback regarding the risk score.

Input/Output (I/O) 109 may include a microphone, keypad, touch screen, and/or stylus through which a user of the mobile device movement detection system 101 may provide input, and may also include one or more of a speaker for providing audio output and a video display device for providing textual, audiovisual and/or graphical output. Software may be stored within memory 115 and/or storage to provide instructions to processor 103 for enabling the mobile device movement detection system 101 to perform various functions. For example, memory 115 may store software used by the mobile device movement detection system 101, such as an operating system 117, application programs 119, and an associated internal database 121. Processor 103 and its associated components may allow the mobile device movement detection system 101 to execute a series of computer-readable instructions to collect and analyze sensor data, detect mobile device movement events, determine risk scores, and provide feedback regarding risk scores.

The mobile device movement detection system 101 may operate in a networked environment supporting connections to one or more remote computers, such as terminals/devices 141 and 151. The mobile device movement detection system 101, and related terminals/devices 141 and 151, may be in signal communication with special-purpose devices installed in vehicles, mobile devices that may travel within vehicles, or devices outside of vehicles that are configured to receive and process sensor data. Thus, the mobile device movement detection system 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the mobile device movement detection system 101.

The network connections depicted in FIG. 1 include a local area network (LAN) 125 and a wide area network (WAN) 129, and a wireless telecommunications network 133, but may also include other networks. When used in a LAN networking environment, the mobile device movement detection system 101 may be connected to the LAN 125 through a network interface or adapter 123. When used in a WAN networking environment, the mobile device movement detection system 101 may include a modem 127 or other means for establishing communications over the WAN 129, such as network 131 (e.g., the Internet). When used in a wireless telecommunications network 133, the mobile device movement detection system 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and mobile device location and configuration system components described herein may be configured to communicate using any of these network protocols or technologies.

Also illustrated in FIG. 1 is a security and integration layer 160, through which communications may be sent and managed between the mobile device movement detection system 101 (e.g., a user's personal mobile device, a vehicle-based system, external server, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the mobile device movement detection system 101. As an example, a security and integration layer 160 of a mobile computing device, vehicle-based device, or a server operated by an insurance provider, financial institution, governmental entity, or other organization, may comprise a set of web application servers configured to use secure protocols and to insulate the mobile device movement detection system 101 from external devices 141 and 151. In some cases, the security and integration layer 160 may correspond to a set of dedicated hardware and/or software operating at the same physical location and under the control of same entities as the mobile device movement detection system 101. For example, layer 160 may correspond to one or more dedicated web servers and network hardware in an organizational datacenter or in a cloud infrastructure supporting a cloud-based mobile device location and configuration system. In other examples, the security and integration layer 160 may correspond to separate hardware and software components which may be operated at a separate physical location and/or by a separate entity.

As discussed below, the data transferred to and from various devices in distracted driving analysis system 100 may include secure and sensitive data, such as driving data, driving locations, vehicle data, and confidential individual data such as insurance data associated with vehicle occupants. In at least some examples, transmission of the data may be performed based on one or more user permissions provided. Therefore, it may be desirable to protect transmissions of such data by using secure network protocols and encryption, and also to protect the integrity of the data when stored in a database or other storage in a mobile device, analysis server, or other computing devices in the distracted driving analysis system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in the distracted driving analysis system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption.

In other examples, one or more web services may be implemented within the mobile device movement detection system 101 in the distracted driving analysis system 100 and/or the security and integration layer 160. The web services may be accessed by authorized external devices and users to support input, extraction, and manipulation of the data (e.g., driving data, location data, confidential personal data, etc.) between the mobile device movement detection system 101 in the distracted driving analysis system 100. Web services built to support the distracted driving analysis system 100 may be cross-domain and/or cross-platform, and may be built for enterprise use. Such web services may be developed in accordance with various web service standards, such as the Web Service Interoperability (WS-I) guidelines. In some examples, a movement data and/or driving data web service may be implemented in the security and integration layer 160 using the Secure Sockets Layer (SSL) or Transport Layer Security (TLS) protocol to provide secure connections between servers (e.g., mobile device movement detection devices 101) and various clients 141 and 151 (e.g., mobile devices, data analysis servers, etc.). SSL or TLS may use HTTP or HTTPS to provide authentication and confidentiality.

In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in the distracted driving analysis system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a driving database, a vehicle database, insurance customer database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of retrieving and analyzing sensor data, such as faster response times and less dependence on network conditions when transmitting/receiving sensor data, vehicle data, occupant data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the mobile device movement detection system 101 within the distracted driving analysis system 100 (e.g., mobile device movement detection software applications, and the like), including computer executable instructions for receiving and storing data from sensors of mobile devices, and/or vehicle-based systems, analyzing the sensor data to determine whether there is a mobile device movement event, calculating a risk score based on aggregated sensor data, providing feedback regarding the risk score, and/or performing other related functions as described herein.

Figure 2:
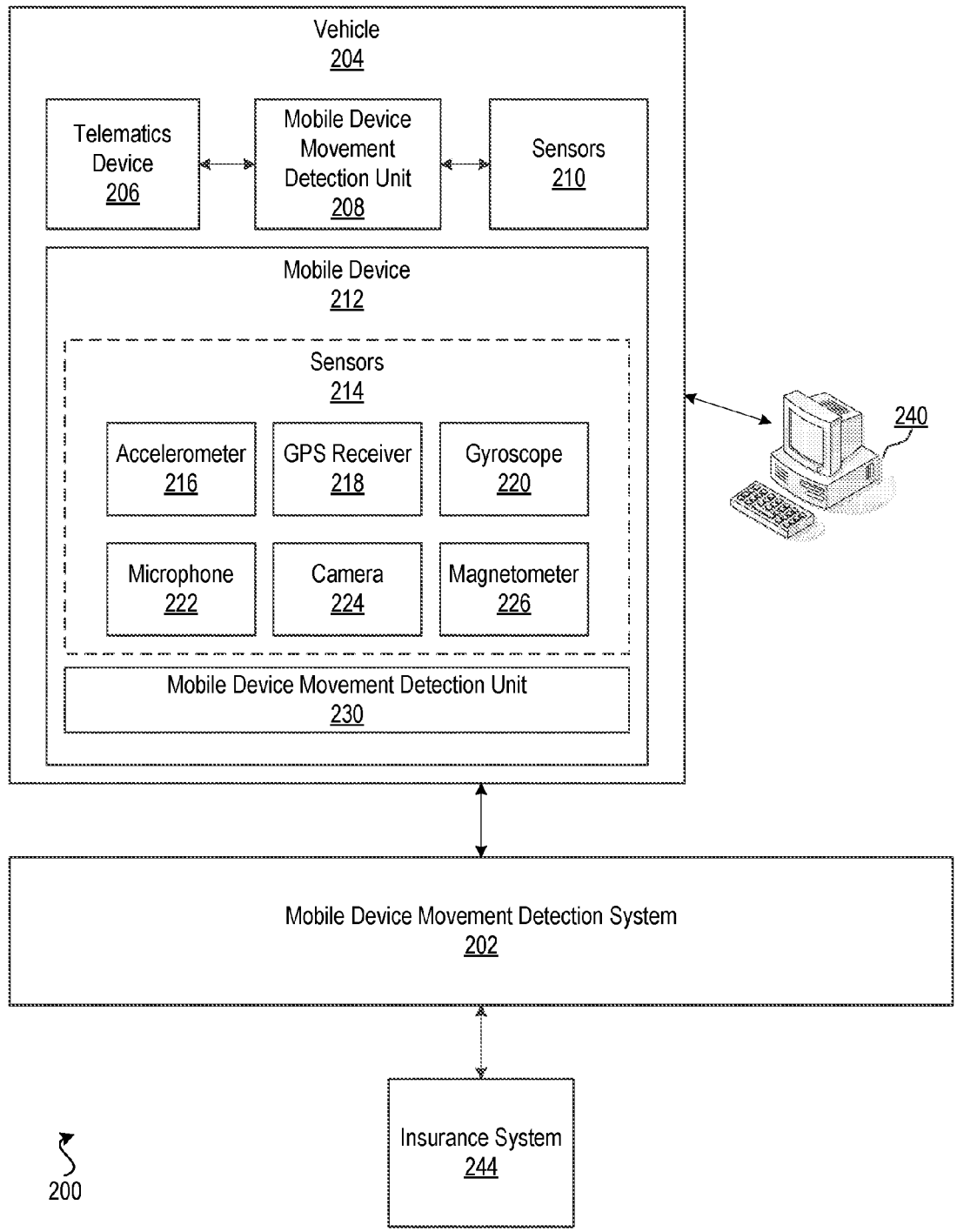
FIG. 2 is a block diagram illustrating various components and devices associated with an example distracted driving analysis system, according to one or more aspects of the disclosure.

FIG. 2 is an illustration of an example implementation of a distracted driving analysis system 200. The distracted driving analysis system 200 may be similar to and/or may include some or all of the components of the distracted driving analysis system 100 in FIG. 1. The system 200, in this example, includes a mobile device movement detection system 202. The mobile device movement detection system 202, described in further detail below, detects movement events relating to a mobile device associated with a vehicle. The mobile device movement detection system 202 may be similar to and/or may include some or all of the components of the mobile device movement detection system 101 in FIG. 1. In some examples, the mobile device movement detection system 202 may detect a mobile device movement event based on sensor data received from one or more mobile devices associated with the vehicle.

The example distracted driving analysis system 200 may contain some or all of the hardware/software components as the distracted driving analysis system 100 depicted in FIG. 1. The mobile device movement detection system 202 is a special-purpose computing device that is configured to receive sensor data from a mobile device 212 located within a vehicle 204. The mobile device movement detection system 202 may initiate communication with, retrieve data from, or receive sensor data (e.g., signals) from one or more sensors within a mobile device 212 wirelessly over one or more computer networks (e.g., the Internet), where the mobile device 212 is located within a vehicle 204. The mobile device movement detection system 202 may also be configured to receive driving data from a vehicle 204 wirelessly via telematics device 206, or by way of separate computing systems (e.g., computer 240) over one or more computer networks (e.g., the Internet). Further, the mobile device movement detection system 202 may be configured to receive driving vehicle-related data from one or more third-party telematics systems or non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet and hail amounts, temperatures, wind, road conditions, visibility, etc.) at various times and locations, and other external data sources containing driving hazard data (e.g., road hazards, traffic accidents, downed trees, power outages, construction zones, school zones, and natural disasters, etc.).

A mobile device 212 in the distracted driving analysis system 200 may be, for example, any mobile device, such as a smartphone, tablet computing device, personal digital assistant (PDA), smart watch, netbook, laptop computer, and other like devices found within a vehicle 204. As used herein, a mobile device 212 "within" the vehicle 204 includes mobile devices that are inside of or otherwise secured to a vehicle, for instance, in the cabins of a vehicle. The mobile device 212 includes a set of mobile device sensors 214, which may include, for example, an accelerometer 216, a GPS receiver 218, a gyroscope 220, a microphone 222, a camera 224, and a magnetometer 226. The mobile device sensors 214 may be capable of detecting and recording various conditions at the mobile device 112 and operational parameters of the mobile device 112. For example, sensors 214 may detect and store data corresponding to the mobile device's location (e.g., GPS coordinates), speed and direction in one or multiple axes (forward and back, left and right, and up and down for example), rate and direction of acceleration or deceleration, specific instances of sudden acceleration, deceleration, lateral movement, and other data which may be indicative of a mobile device movement event. Additional sensors 214 may include audio sensors, video sensors, signal strength sensors, communication network-presence sensors, ambient light sensors, temperature/humidity sensors, and/or barometer sensors, which may be used to, for example, listen to audio signals indicating a door locking/unlocking, door chime, or vehicle ignition, sensing light from an overhead or dashboard light, detecting a temperature or humidity change indicative of entering a vehicle, and/or detecting a presence of a network or communication device associated with a vehicle (e.g., a BLUETOOTH transceiver associated with a vehicle).

Software applications executing on mobile device 212 may be configured to detect certain driving data independently using mobile device sensors 214. For example, mobile device 212 may be equipped with sensors 214, such as an accelerometer 216, a GPS receiver 218, a gyroscope 220, a microphone 222, a camera 224, and/or a magnetometer 226, and may determine vehicle location, speed, acceleration/deceleration, direction and other basic driving data without needing to communicate with the vehicle sensors 210, or any vehicle system. In other examples, software on the mobile device 212 may be configured to receive some or all of the driving data collected by vehicle sensors 210.

Additional sensors 214 may detect and store external conditions. For example, audio sensors and proximity sensors 214 may detect other nearby mobile devices, traffic levels, road conditions, traffic obstructions, animals, cyclists, pedestrians, and other conditions that may factor into a braking event data analysis.

Data collected by the mobile device sensors 214 may be stored, processed, and/or analyzed within the mobile device 212, and/or may be transmitted to one or more external devices for processing, analysis, and the like. For example, as shown in FIG. 2, sensor data collected by the mobile device sensors 214 may be transmitted to a mobile device movement detection system 202. In some examples, the data collected by the mobile device sensors 214 may be stored, processed, and/or analyzed at the vehicle 204 by an on-board computing device in the vehicle or by the mobile device 212, and/or may be transmitted to one or more external devices (e.g., an insurance system 244). For example, sensor data may be exchanged (uni-directionally or bi-directionally) between vehicle 204 and mobile device 212.

Data may be transmitted between the mobile device 212 and the vehicle 204 via wireless networks, including those discussed above, or short-range communication systems. Short-range communication systems are data transmission systems configured to transmit and receive data between nearby devices. In this example, short-range communication systems may be used to transmit sensor data to other nearby mobile devices and/or vehicles, and to receive sensor data from other nearby mobile devices and/or vehicles. Short-range communication systems may be implemented using short-range wireless protocols such as WLAN communication protocols (e.g., IEEE 802.11), Bluetooth (e.g., IEEE 802.15.1), or one or more of the Communication Access for Land Mobiles (CALM) wireless communication protocols and air interfaces. The transmissions between the short-range communication systems may be sent via Bluetooth, satellite, GSM infrared, IEEE 802.11, WiMAX, RFID, and/or any suitable wireless communication media, standards, and protocols. In certain systems, short-range communication systems may include specialized hardware installed in vehicle 204 and/or mobile device 212 (e.g., transceivers, antennas, etc.), while in other examples the communication systems may be implemented using existing hardware components (e.g., radio and satellite equipment, navigation computers) or may be implemented by software running on the mobile device 212 and/or on an on-board computing device within the vehicle 204.

The vehicle 204 may be, for example, an automobile, motorcycle, scooter, bus, recreational vehicle, boat, bicycle, or other vehicle in which a mobile device may be located. The vehicle 204 may include one or more sensors 210, which are capable of detecting and recording various conditions at the vehicle and operating parameters of the vehicle. For example, the sensors 210 may detect, transmit, or store data corresponding to the vehicle's location (e.g., GPS coordinates), speed and direction, rate and direction of acceleration, deceleration, and/or may detect transmit specific instances of sudden acceleration, sudden deceleration, and swerving. The sensors 210 may also detect, transmit, or store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. Thus, in some examples, the mobile device movement detection system 202 may acquire information about the vehicle 204 directly from the vehicle 204.

Additional sensors 210 may detect and store the external driving conditions, for example, external temperature, rain, snow, light levels, and sun position for driver visibility. Additional sensors 210 may also detect and store data relating to compliance with traffic laws and the observance of traffic signals and signs. Additional sensors 210 may further detect and store data relating to the maintenance of the vehicle 204, such as the engine status, oil level, engine coolant temperature, odometer reading, the level of fuel in the fuel tank, engine revolutions per minute (RPMs), tire pressure, or combinations thereof.

The vehicle 204 may also include cameras or proximity sensors 210 capable of recording additional conditions inside or outside of the vehicle 204. For example, internal cameras 210 may detect conditions such as the number of passengers and the types of passengers (e.g., adults, children, teenagers, handicapped, etc.) in the vehicles, and potential sources of driver distraction within the vehicle (e.g., pets, phone usage, unsecured objects in the vehicle). Sensors 210 also may be configured to collect data a driver's movements or the condition of a driver. For example, the vehicle 204 may include sensors 210 that monitor a driver's movements, such as the driver's eye position and/or head position, etc. Additional sensors 210 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer. Further, the vehicle 204 may include sensors 210 that are capable of detecting other nearby vehicles, traffic levels, road conditions, traffic obstructions, animals, cyclists, pedestrians, and other conditions that may factor into an analysis of vehicle telematics data. Certain vehicle sensors 210 also may collect information regarding the driver's route choice, whether the driver follows a given route, and to classify the type of trip (e.g., commute, errand, new route, etc.). A Global Positioning System (GPS), locational sensors positioned inside the vehicle 204, and/or locational sensors or devices external to the vehicle 204 may be used determine the route, trip type (e.g., commute, errand, new route, etc.), lane position, and other vehicle position or location data.

The data collected by the vehicle sensors 210 may be stored or analyzed within the respective vehicle 204 by an on-board computing device or mobile device 212, or may be transmitted to one or more external devices. For example, as shown in FIG. 2, sensor data may be transmitted to a mobile device movement detection system 202, which may be a collection of special-purpose computing devices that are interconnected and in signal communication with each other. The special-purpose computing devices may be programmed with a particular set of instructions that, when executed, perform functions associated with processing the sensor data to detect mobile device movement events, calculating a risk score, and generating and/or providing feedback to the mobile device or vehicle based on the calculated risk score. As such, a mobile device movement detection system 202 may be a separate special-purpose computing device or may be integrated into one or more components within the vehicle 204, such as the telematics device 206, or in the internal computing systems (e.g., on-board vehicle computing device) of the vehicle 204. Additionally, the sensor data may be transmitted as vehicle telematics data via a telematics device 206 to one or more remote computing devices, such as a mobile device movement detection system 202. A telematics device 206 may be a computing device containing many or all of the hardware/software components as the mobile device movement detection system 101 depicted in FIG. 1. As discussed above, the telematics device 206 may receive vehicle telematics data from vehicle sensors 210, and may transmit the data to one or more external computer systems (e.g., an insurance system 244) over a wireless network. Telematics devices 206 also may be configured to detect or determine additional types of data relating to real-time driving and the condition of the vehicle 204. In certain embodiments, the telematics device 206 may contain or may be integral with one or more of the vehicle sensors 210. The telematics device 206 may also store the type of the vehicle 204, for example, the make, model, trim (or sub-model), year, and/or engine specifications, as well as other information such as vehicle owner or driver information, insurance information, and financing information for the vehicle 204.

In the example shown in FIG. 2, the telematics device 206 may receive vehicle telematics data from vehicle sensors 210, and may transmit the data to a mobile device movement detection system 202. However, in other examples, one or more of the vehicle sensors 210 may be configured to transmit data directly to a mobile device movement detection system 202 without using a telematics device 206. For instance, a telematics device 206 may be configured to receive and transmit data from certain vehicle sensors 210, while other sensors may be configured to directly transmit data to a mobile device movement detection system 202 without using the telematics device 206. Thus, telematics devices 206 may be optional in certain embodiments.

In certain embodiments, the mobile device 212 within the vehicle 204 may be programmed with instructions to collect vehicle telematics data from the telematics device 206 or from the vehicle sensors 210, and then to transmit the vehicle telematics data to the mobile device movement detection system 202 and other external computing devices. For example, the mobile device 212 may transmit the vehicle telematics data directly to a mobile device movement detection system 202, and thus may be used in conjunction with or instead of the telematics device 206. Moreover, the processing components of the mobile device 212 may be used to collect and analyze sensor data and/or vehicle telematics data to detect mobile device movement events, calculate a risk score, provide feedback to mobile device or vehicle based on the risk score, and perform other related functions. Therefore, in certain embodiments, the mobile device 212 may be used in conjunction with or instead of the mobile device movement detection unit 208.

The vehicle 204 may include a mobile device movement detection unit 208, which may be a separate computing device or may be integrated into one or more other components within the vehicle 204, such as the telematics device 206, the internal computing systems of the vehicle 204, and/or the mobile device 212. In some examples, the mobile device 212 may include a mobile device movement detection unit 230 which may be a device separate and independent from the mobile device movement detection unit 208 of the vehicle 204. The mobile device movement detection units 208 and 230 may alternatively be implemented by computing devices separate and independent from the vehicle 204 and the mobile device 212, such as one or more computer systems 240. In any of these examples, the mobile device movement detection units 208 and 230 may contain some or all of the hardware/software components as the mobile device movement detection system 101 depicted in FIG. 1.

The mobile device movement detection units 208 and 230 may be implemented in hardware and/or software configured to receive raw sensor data from the vehicle sensors 210 and the mobile device sensors 214 respectively, and/or other vehicle telematics data sources. The mobile device movement detection unit 208 may further be configured to receive sensor data from a telematics device 206. After receiving the sensor data and vehicle telematics data, the mobile device movement detection units 208 and 230 may process the sensor data and vehicle telematics data, and analyze the sensor data and vehicle telematics data to determine whether a mobile device movement event occurred at a particular time. One or more notifications including feedback may be generated based on a calculation of a risk score to the mobile device 212 or vehicle 204. For example, the mobile device movement detection units 208 and 230 may analyze the sensor data collected from the mobile sensors 214 and the vehicle sensors 210. The mobile device movement detection units 208 and 230 may determine whether there is a threshold change in the direction of acceleration of the mobile device 212. In examples where there is a threshold change in the direction of acceleration of the mobile device 212, the mobile device movement detection units 208 and 230 may determine that a mobile device movement event has occurred as a particular time. The mobile device movement detection units 208 and 230 may then aggregate sensor data and vehicle telematics data associated with a window of time encompassing the mobile device movement event, and calculate a risk score based on the aggregated data. The mobile device movement detection units 208 and 230 may then generate and provide feedback to the mobile device 212 or vehicle 204 based on the calculated risk score.

Further, in certain implementations, the functionality of the mobile device movement detection units 208 and 230, such as collecting and analyzing sensor data to detect mobile device movement events, aggregating sensor data and vehicle telematics data, calculating a risk score based on the aggregated data, and providing notifications to the driver or vehicle based on the calculated risk score, may be performed in a mobile device movement detection system 202 rather than by the individual vehicle 204 or mobile device 212. In such implementations, the vehicle 204 or mobile device 212 may only collect and transmit sensor data to a mobile device movement detection system 202, and thus the mobile device movement detection units 208 and 230 may be optional. Thus, in various examples, the analyses and actions performed within the mobile device movement detection units 208 and 230 may be performed entirely within the mobile device movement detection units 208 and 230, entirely within the mobile device movement detection system 202, or in some combination of the two. For instance, the mobile device movement detection units 208 and 230 may continuously receive and analyze sensor data and determine whether the sensor data indicates a change in the direction of acceleration/deceleration that is above a predefined threshold. While the changes in the direction of acceleration/deceleration are below the predefined threshold (i.e., there is minimal likelihood of a mobile device movement event), the mobile device movement detection units 208 and 230 may continue to receive and analyze data, such that large or repetitive amounts of data need not be transmitted to the mobile device movement detection system 202. However, upon detecting a change in the direction of acceleration/deceleration above the predefined threshold, the mobile device movement detection units 208 and 230 may transmit sensor data and vehicle telematics data associated with a window of time encompassing the mobile device movement event to the mobile device movement detection system 202, such that the mobile device movement detection system 202 may aggregate the sensor data and vehicle telematics data associated with the window of time to calculate a risk score for that window of time.

Additional arrangements, as well as detailed descriptions and examples of the analyses that may be performed by the mobile device movement detection units 208 and 230 and/or by the mobile device movement detection system 202 are described below.

Figure 3:
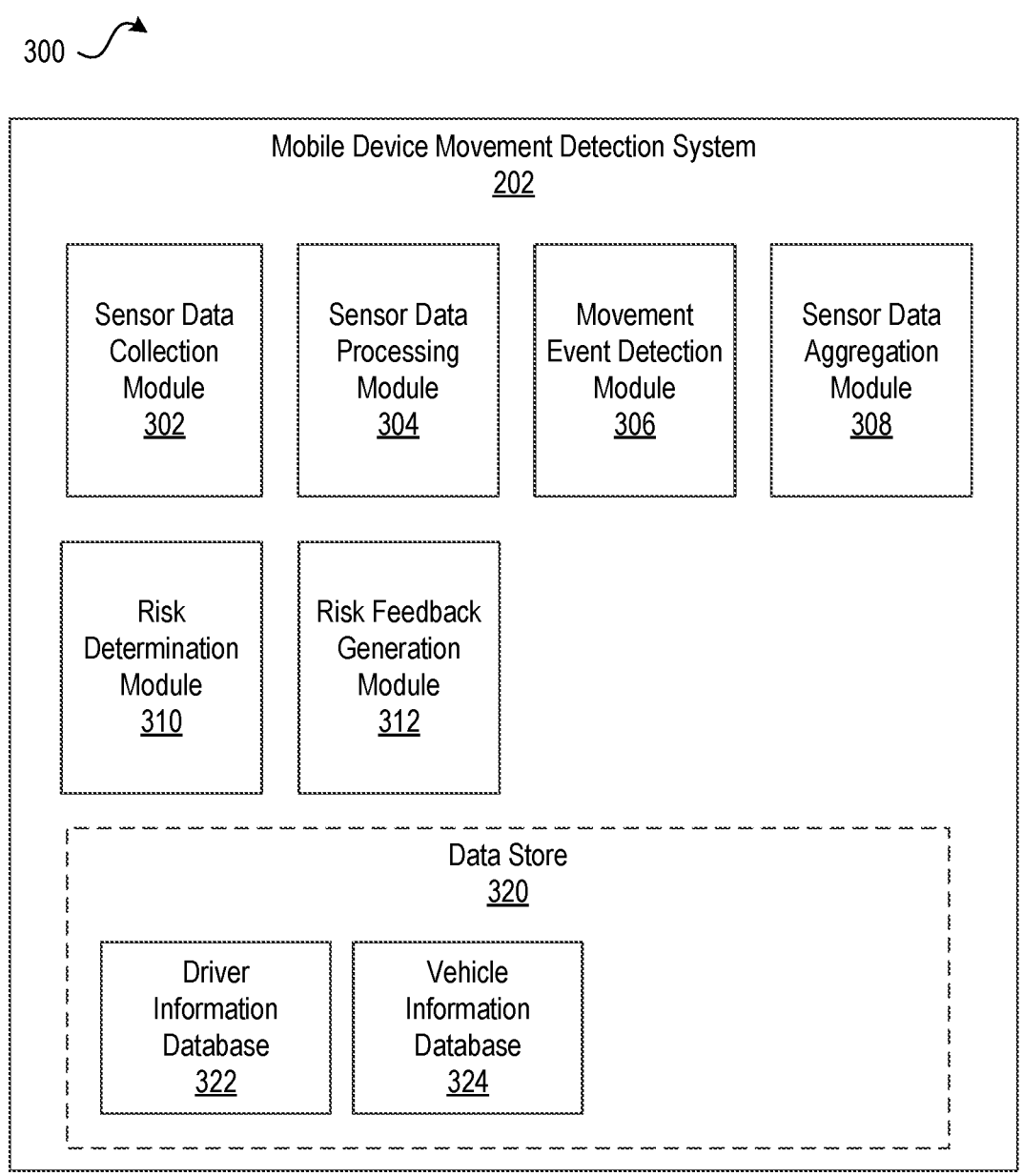
FIG. 3 is a block diagram of an example of an implementation of a mobile device movement detection system, according to one or more aspects of the disclosure.

FIG. 3 shows an example implementation of a mobile device movement detection system 202. In some example implementations, the mobile device movement detection system 202 is a special-purpose computing device programmed with instructions, that when executed, perform functions associated with collecting or receiving sensor data from mobile devices and vehicles, processing the sensor data, determining whether a mobile device movement event occurred at a particular time, aggregating sensor data over a window of time encompassing the mobile device movement event, calculating a risk score based on the aggregated sensor data, and generating and/or providing feedback to the mobile device or vehicle based on the calculated risk score. In these example implementations, the units 302-312 of the mobile device movement detection system 202 correspond to particular sets of instructions embodied as software programs residing at the mobile device movement detection system 202. In other example implementations, the mobile device movement detection system 202 is a collection of special-purpose computing devices that are interconnected and in signal communication with each other. In these examples, each unit or device 302-312 of the mobile device movement detection system 202 respectively corresponds to a special-purpose computing device programmed with a particular set of instructions, that, when executed, perform respective functions associated with collecting or receiving sensor data from mobile devices and vehicles, processing the sensor data, determining whether a mobile device movement event occurred at a particular time, aggregating sensor data over a window of time encompassing the mobile device movement event, calculating a risk score based on the aggregated sensor data, and generating and/or providing feedback to the mobile device or vehicle based on the calculated risk score. Such special-purpose computing devices may be, for example, application servers programmed to perform the particular set of functions.

The mobile device movement detection system 202, in this example, includes various modules, units and databases that facilitate collecting or receiving sensor data, processing the sensor data, determining whether a mobile device movement event occurred at a particular time, aggregating sensor data over a window of time encompassing the mobile device movement event, calculating a risk score based on the aggregated sensor data, and generating and/or providing feedback to the mobile device or vehicle based on the calculated risk score. It will be appreciated that the mobile device movement detection system 202 illustrated in FIG. 3 is shown by way of example, and that other implementations of a mobile device movement detection system may include additional or alternative modules, units, devices, and/or databases without departing from the scope of the claimed subject matter. In this example, the mobile device movement detection system 202 includes a sensor data collection module 302, a sensor data processing module 304, a movement event detection module 306, a sensor data aggregation module 308, a risk determination module 310, a risk feedback generation module 312, and a data store 320. Each module may include hardware and/or software configured to perform various functions within the mobile device movement detection system 202. Further, each module may be a separate and distinct computing device or one or more modules may be integrated into a single computing device.

The data store 320 may store information relating to the driver of the vehicle 204, information relating to the vehicle 204, and/or information relating to the mobile device 212. For example, the data store 320 may include a driver information database 322, and a vehicle information database 324. It will be appreciated that in other examples, the data store 320 may include additional and/or alternative databases.

The driver information database 322 may store information associated with drivers of the vehicles 204 (e.g., name of driver, contact information, one or more associated mobile devices, one or more associated vehicles, etc.). In some examples, the driver information database 322 may also store the driver's affiliation with one or more insurance providers.

The vehicle information database 324 may store information associated with the vehicles 204 (e.g., make, model, mileage, last maintenance date, accident reports, etc.).

Figure 4:
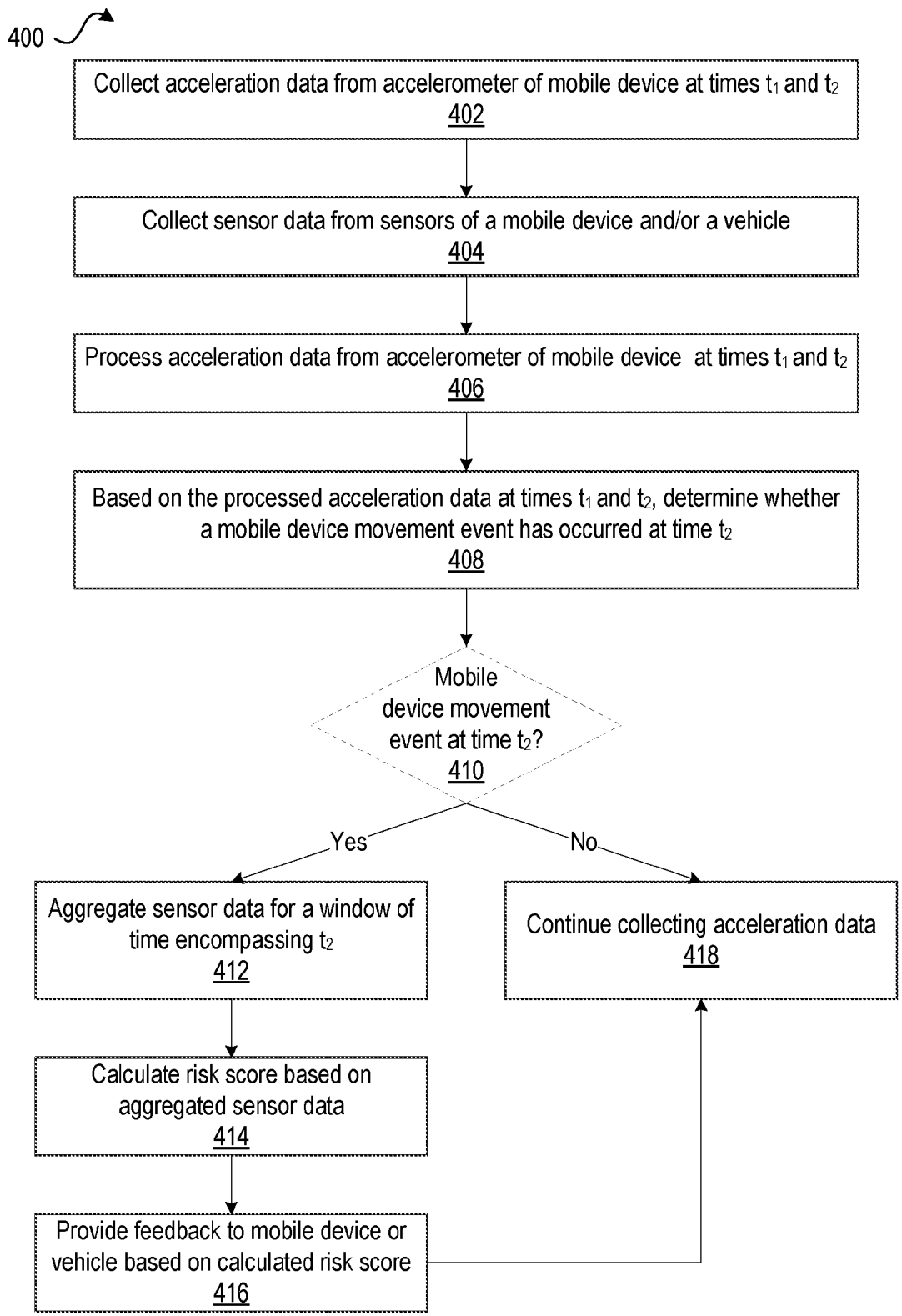
FIG. 4 is a flowchart of example method steps for receiving and processing sensor data from a mobile device, detecting a mobile device movement event, aggregating the sensor data from the mobile device, calculating a risk score based on the aggregated data, and providing feedback, according to one or more aspects of the disclosure.

FIG. 4 is a flowchart 400 of example steps for determining whether a mobile device movement event occurred at a particular time, calculating a risk score, and providing feedback based on the risk score according to one or more aspects described herein. The various components of the mobile device movement detection system 202 and/or the mobile device movement detection unit 230 of the mobile device 212 may be used to perform these method steps.

In step 402, the sensor data collection module 302 may receive acceleration data from the accelerometer 216 of the mobile device 212 at times $t_1$ and $t_2$. Times $t_1$ and $t_2$ may be separated by a predefined duration of time (e.g., one second, one millisecond, etc.), such that time $t_1$ precedes time $t_2$ The acceleration data (signal) at times $t_1$ and $t_2$ may be represented as three-dimensional vectors having a magnitude and a direction. In some examples, the acceleration data (signal) may include a gravity component and a non-gravity component, where the gravity component represents the acceleration due to gravity and where the non-gravity component represents the linear acceleration due to the movement of the mobile device 212.

In step 404, the sensor data collection module 302 may receive sensor data from the one or more sensors 214 installed at, attached to, and/or remotely located relative to the mobile device 212. In some examples, the mobile device 212 may collect sensor data from the one or more sensors 214 and transmit the sensor data to the mobile device movement detection system 202 in real-time or near real-time. As such, the mobile device 212 may broadcast the sensor data from the one or more sensors 214, transmit the sensor data to the mobile device movement detection unit 230 in real-time, and the mobile device movement detection unit 230 may transmit the sensor data to the mobile device movement detection system 202. The mobile device movement detection unit 230 may or may not transmit the sensor data to the mobile device movement detection system 202 in real-time. For instance, the mobile device movement detection unit 230 may begin to collect sensor data from the one or more sensors 214, and wait to transmit sensor data from the one or more sensors 214 until the mobile device movement detection unit 230 or mobile device movement detection system 202 detects a mobile device movement event (e.g., in step 410). In another example, the mobile device movement detection unit 230 may transmit sensor data to the mobile device movement detection system 202 in response to a request from the mobile device movement detection system 202 to collect and transmit sensor data associated with a window of time. As such, the mobile device movement detection unit 230 advantageously limits and/or controls the number of transmissions between the mobile device 212 and the mobile device movement detection system 202. Examples of sensor data collected in step 404 from the sensors 214 of the mobile device 212 may include acceleration from the accelerometer 216, location from the GPS receiver 218, rotational motion from the gyroscope 220, sound from the microphone 222, movement from the camera 224, and magnetization from the magnetometer 226. Further, as mentioned above, the sensor data may also include data received from sensors 210 of the vehicle 204, and/or data received from third-party sources (e.g., traffic data, weather data, etc.).

In certain embodiments, in addition to the sensor data obtained from the sensors 214 of the mobile device 212, the sensor data collection module 302 may collect and process sensor data from the sensors 210 of the vehicle 204. The sensor data from the sensors 210 of the vehicle 204 may be used to supplement the sensor data from the sensors 214 of the mobile device 212 as desired. The additional data may be beneficial in providing increased accuracy in vehicle telematics data. For example, where signal communication with the mobile device 212 is lost, the sensor data collection module 302 may collect and process sensor data from the sensors 210 of the vehicle 204.

In step 406, the sensor data processing module 304 may process the acceleration data (signal) received from the accelerometer 216 of the mobile device at times $t_1$ and $t_2$ In some examples, the sensor data processing module 304 may apply one or more algorithms to separate the acceleration due to gravity from linear acceleration due to the movement of the mobile device 212 at times $t_1$ and $t_2$. For instance, the sensor data processing module 304 may apply a low pass filter to the original acceleration data (signal) to isolate the acceleration due to gravity. The sensor data processing module 304 may then remove (e.g., subtract) the acceleration due to gravity from the original acceleration data (signal). Alternatively, in another example, the sensor data processing module 304 may apply a high pass filter to extract the linear acceleration from the original acceleration data (signal). As such, in these examples, the processed acceleration signal represents only the linear acceleration due to the movement of the mobile device 212.

In other examples, the sensor data processing module 304 may additionally or alternatively use a gravity sensor of the mobile device to determine the acceleration due to gravity. In these examples, the sensor data processing module 304 may then apply one or more algorithms to remove the acceleration from gravity from the original acceleration data (signal) to isolate the acceleration due to gravity.

In step 408, the movement event detection module 306 may determine whether a mobile device movement event occurred at time $t_2$ based on the processed acceleration data (signal) at times $t_1$ and $t_2$.

Figure 5:
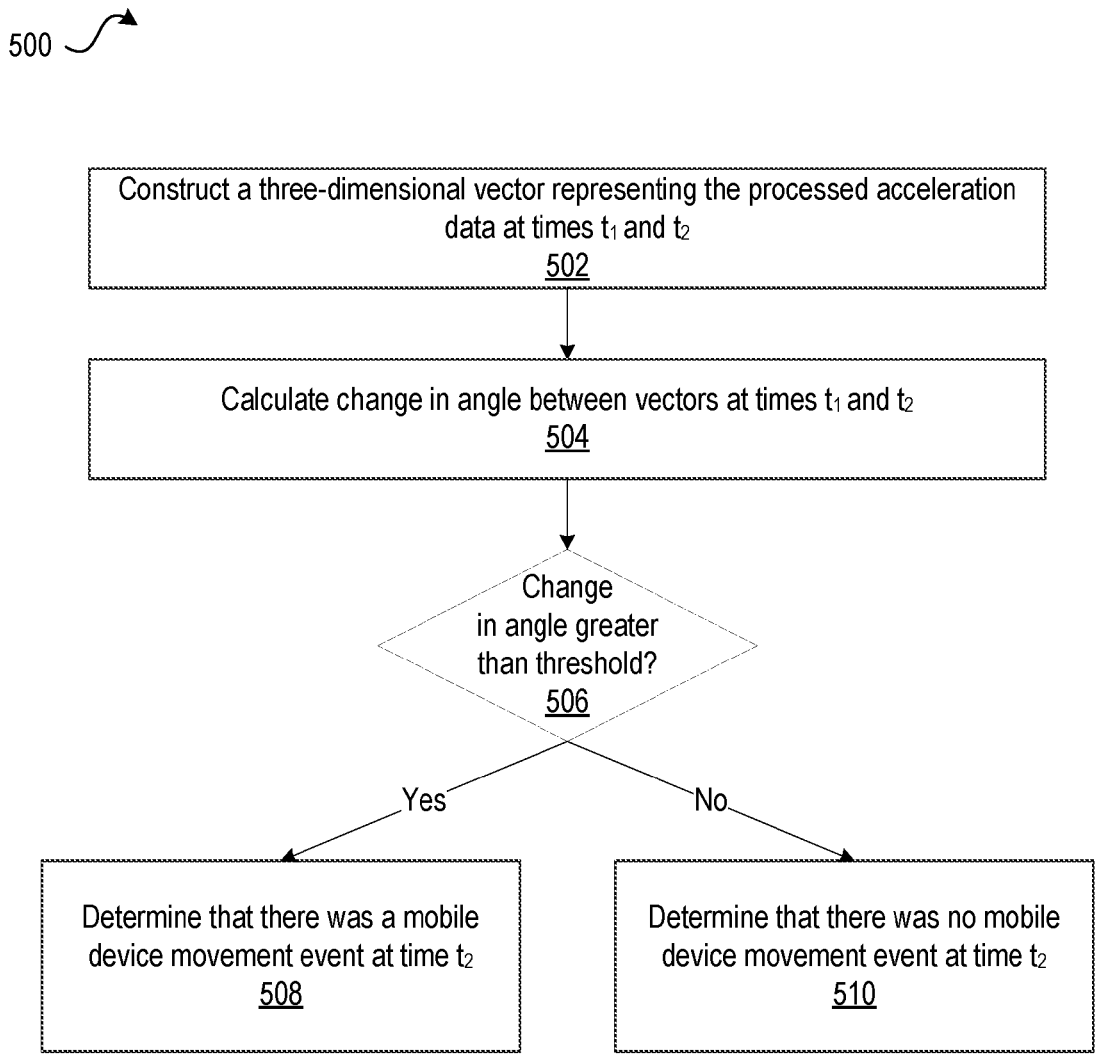
FIG. 5 is a flowchart of example method steps for detecting a mobile device movement event, according to one or more aspects of the disclosure.

Referring now to FIG. 5, a flowchart 500 of example method steps for detecting a mobile device movement event is shown. The movement event detection module 306 of the mobile device movement detection system 202 and/or of the mobile device movement detection unit 230 may be used to perform these method steps. At step 502, the movement event detection module 306 may construct three-dimensional vectors representing the processed acceleration data (signals) at times $t_1$ and $t_2$ In some examples, the acceleration vector at time $t_1$ may be represented as vector a, having an x-axis component $a_x$, a y-axis component $a_y$, and a z-axis component $a_z$. Similarly, the acceleration vector at time $t_2$ may be represented as a vector b, having an x-axis component $b_x$, a y-axis component $b_y$, and a z-axis component $b_z$.

At step 504, the movement event detection module 306 may calculate a change in angle between the vectors at times $t_1$ and $t_2$ In some examples, a formula to calculate a change of angle between vectors may be derived from the formula for calculating the dot product of the vectors a and b. An example of this computation is shown below:

$$a \cdot b \begin{pmatrix} a_x \\ a_y \\ a_z \end{pmatrix} \cdot \begin{pmatrix} b_x \\ b_y \\ b_z \end{pmatrix} = a_x b_x + a_y b_y + a_z b_z =$$

$$|a||b|\cos\alpha \Longrightarrow \cos\alpha = \frac{a_x b_x + a_y b_y + a_z b_z}{\sqrt{a_x^2 + a_y^2 + a_z^2} \sqrt{b_x^2 + b_y^2 + b_z^2}} \Longrightarrow \alpha =$$

$$\cos^{-1} \frac{a_x b_x + a_y b_y + a_z b_z}{\sqrt{a_x^2 + a_y^2 + a_z^2} \sqrt{b_x^2 + b_y^2 + b_z^2}}$$

In step 506, the movement event detection module 306 may determine whether the change in angle between the vectors a and b is greater than a predetermined threshold (e.g., greater than 0.2°, greater than 0.5°, etc.). Where the change in angle is above predetermined threshold in step 506, the movement event detection module 306 may determine that there was likely a mobile device movement event at time $t_2$ in step 508. Alternatively, where the change in angle is not above the predetermined threshold in step 506, the movement event detection module 306 may determine that there was likely no mobile device movement event at time $t_2$ in step 510.

Referring back to FIG. 4, where the movement event detection module 306 determines that there was likely no mobile device movement event at time $t_2$ in step 410, the movement event detection module 306 may continue collecting acceleration data for new times $t_1$ and $t_2$ in step 418. As such, method steps 402-410 may be repeated using a consecutive window algorithm, such that the consecutive windows are adjacent but not overlapping. As such, in these examples, the mobile device movement detection system 202 advantageously limits and/or controls the number of transmissions between the mobile device 212 and the mobile device movement detection system 202. Further, the mobile device movement detection system 202 advantageously limits and/or controls the aggregation of sensor data.

Figure 6:
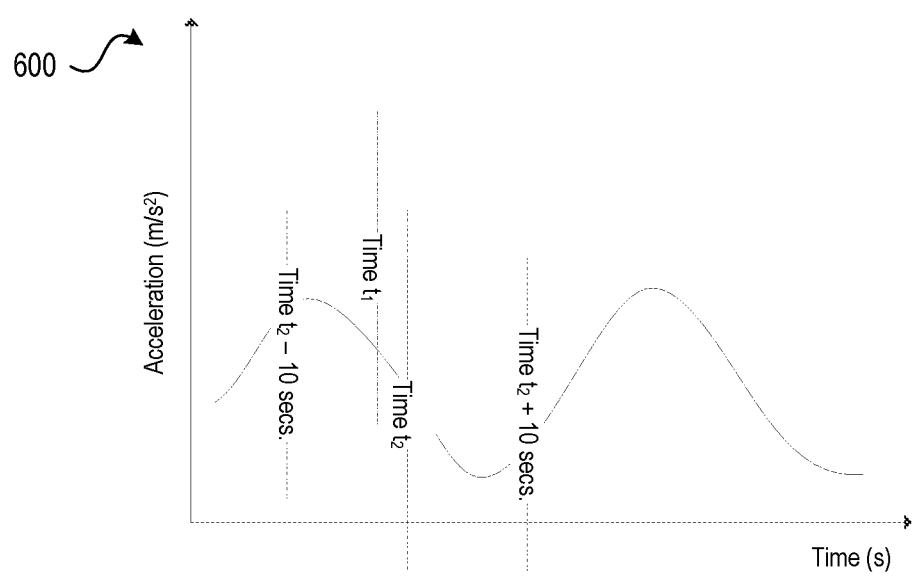
FIG. 6 illustrates a consecutive window approach to detecting mobile device movement events, according to one or more aspects of the disclosure.

Alternatively, where the movement event detection module 306 determines that there was likely a movement device movement event at time $t_2$ in step 410, the sensor data aggregation module 308 may aggregate the sensor data collected in step 404 for a window of time encompassing the mobile device movement event (e.g., encompassing the time $t_2$). As such, the sensor data aggregation module 308 may aggregate sensor data during a window of time starting at a first predetermined duration before the time $t_2$ and ending at a second predetermined duration after the time $t_2$. For instance, the sensor data aggregation module 308 may aggregate sensor data from time $t_2-10$ seconds to $t_2+10$ seconds in step 412, as shown in FIG. 6. As such, the sensor data aggregation module 308 may gather sensor data for a window of time of 21 seconds. It will be appreciated that the window of time used by the sensor data aggregation module 308 may be configured to use varying windows of time, such that a window of time may be greater or lesser than 21 seconds. For example, the sensor data aggregation module 308 may be configured such that the first predetermined duration is longer, shorter, or the same as the second predetermined duration.

In step 414, the risk determination module 310 may calculate a risk score based on the aggregated sensor data. In some examples, the risk score may be based on a plurality of factors, including the speed of the vehicle (e.g., the minimum/maximum speed during the window of time, the average speed during the window of time, etc.), road type (e.g., city street, highway, etc.), weather, time of day, known or unknown route, and phone type (e.g., make and model of mobile device 212). Other factors may be tied to the acceleration data collected from the mobile device 212, such as the intensity of the phone movement as determined by the magnitude of the acceleration vector at time $t_2$. In some examples, the risk determination module 310 may apply factors based on historical determinations by the movement event detection module 306, such as the frequency of mobile device movement events (e.g., average number of mobile device movement events per trip, average number of mobile device events per a predetermined duration of time, etc.).

In some examples, risk determination module 310 may assign a score for each factor. For instance, the risk determination module 310 may be configured such that a higher score is assigned to a maximum speed of the vehicle above a predetermined value during the window of time, whereas a lower score is assigned to a maximum speed of the vehicle above the predetermined value during the window of time. In a further example, the risk determination module 310 may be configured such that a higher score is assigned to driving in rainy or snow weather conditions, whereas a lower score is assigned to driving in dry weather conditions. It will be appreciated that the risk determination module 310 may be similarly configured for other factors utilized to calculate a risk score.

Once each factor is assigned a score, the risk determination module 310 may apply a risk calculation equation to determine the risk score. An example risk calculation equation may be:

risk score=factor[1].score+factor[2].score+ . . . +factor[n].score where factor[1].score . . . factor[n].score are the respective scores assigned to each factor. In some examples, the scores assigned to each factor may be weighted by the risk calculation equation. An example weighted risk calculation equation may be:

risk score=(factor[1].score×weight[1])+(factor[2].score×weight[2])+ . . . +(factor[n].score×weight[n])

where weight[1] . . . weight[n] are the weights respectively associated with factor[1] . . . factor[n]

It will be appreciated that additional or alternative mathematical operations may be selectively employed to aggregate the scores for each factor. It will also be appreciated that the risk determination module 310 may be configured to apply one or more risk calculation equations that respectively use different factors with different assigned scores and/or weights. For example, the risk determination module 310 may be configured to use one risk calculation equation for a driver associated with a first company, and a second risk calculation equation for a driver associated with a second insurance company.

In step 416, the risk feedback generation module 312 may provide feedback to the mobile device 212 or vehicle 204 based on the calculated risk score. The risk feedback generation module 312 may recommend providing feedback where the calculated risk score is above a predetermined threshold, and/or where particular factors are present. For instance, the risk feedback generation module 312 may generate a notification or warning to advise the driver to stop interaction with the mobile device 212 during weather conditions with low visibility. In another example, the risk feedback generation module 312 may generate a notification or warning to advise the driver to stop interaction with the mobile device 212 while traveling at a speed of above 50 mph.

In other examples, the risk feedback generation module 312 may generate a notification or warning to advise the driver of the most significant factor or factors contributing to a calculated risk score above a predetermined threshold. For example, where the calculated risk score is above the threshold primarily because of the vehicle's speed during the window of time, the risk feedback generation module 312 may generate a notification or warning to decrease the vehicle's speed in order to improve the calculated risk score.

The notification or warning may be, for example, a combination of audio, text, graphics, or other gestures (e.g., vibrations). In some examples, the notification or warning may be communicated to a driver of a vehicle 204 via a dashboard installed or attached to the vehicle. In other examples, the notification or warning may be communicated to the driver of the vehicle via the mobile device 212 or a wearable device. Further, the notification may serve as a disruptive alarm to the driver of the vehicle, or a passive notification. For example, where the mobile device movement event occurs during more dangerous driving conditions (e.g., high speed of the vehicle 204, rainy or snowy weather conditions, low visibility, peak traffic hours, etc.), or if mobile device movement events are frequent (e.g., above a threshold amount of mobile device movement events detected during a trip), the risk feedback generation module 312 may issue an alarm. Alternatively, in these cases, the risk feedback generation module 312 may disable the user interface of the mobile device 212 to prevent further interaction with the mobile device 212. Conversely, where the mobile device movement event occurs during safer driving conditions (e.g., non-peak traffic, high visibility, below average speed of the vehicle, etc.), the risk feedback generation module 312 may issue a more passive notification. For example, the risk feedback generation module 312 may warn the driver via an audio or graphical message on the mobile device 212, and/or through a vibration of a vehicle component in contact with the driver (e.g., the steering wheel, one or more pedals, etc.).

Once the risk feedback determination module 312 has provided the feedback to the mobile device 212 or vehicle 204, the mobile device movement detection system 202 may continue collecting acceleration data for new times for new times $t_1$ and $t_2$, where the new time $t_1$ is after the previous time $t_2$+10 seconds. As such, method steps 402-410 may be repeated using a consecutive window algorithm, such that the consecutive windows are adjacent but not overlapping.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A mobile device movement detection system comprising:
    at least one processor; and
    memory storing computer-readable instructions, that when executed by the at least one processor, cause the system to:
        collect, by a sensor data collection device of the system, acceleration data from an accelerometer associated with a mobile device within a vehicle at a first time and at a second time;
        collect, by the sensor data collection device, sensor data from sensors associated with the mobile device, wherein the sensors comprise the accelerometer, a GPS receiver, and a gyroscope;
        process, by a sensor data processing device, the acceleration data to remove a gravity component of the acceleration data, and generate a processed acceleration data at the first time and at the second time;
        determine, by a movement event detection device, that a mobile device movement event has occurred at the second time based, at least in part, on three-dimensional vectors representing the processed acceleration data at the first time and at the second time;
        aggregate, by a sensor data aggregation device, the sensor data from the sensors associated with the mobile device for a window of time starting a first predetermined duration before the second time and ending a second predetermined duration after the second time, and generate an aggregated sensor data;
        determine, by a risk determination device, a risk score based, at least in part, on the aggregated sensor data for the window of time; and
        generate, by a risk feedback generation device, a notification to the mobile device based, at least in part, on the risk score.

2. The system of claim 1 wherein determining that a mobile device movement event has occurred at the second time includes:
    calculating, by the movement event detection device, a difference in angle between the three-dimensional vectors representing the processed acceleration data at the first time and the second time; and
    determining, by the movement event detection device, that the difference in angle is greater than a predetermined threshold angle.

3. The system of claim 1 wherein processing the acceleration data to remove the gravity component of the acceleration data includes:
    applying, by the sensor data processing device, a low pass filter to the acceleration data at the first time to isolate an acceleration due to gravity at the first time;
    removing, by the sensor data processing device, the acceleration due to gravity at the first time from the acceleration data at the first time;

applying, by the sensor data processing device, the low pass filter to the acceleration data at the second time to isolate an acceleration due to gravity at the second time; and removing, by the sensor data processing device, the acceleration due to gravity at the second time from the acceleration data at the second time.

4. The system of claim 1, further including instructions that, when executed by the at least one processor, cause the system to:

collect, by the sensor data collection device, supplemental sensor data from sensors associated with the vehicle during the window of time, and aggregate, by the sensor data aggregation device, to generate supplemental aggregated sensor data; and determine, by the risk determination device, a risk score based, at least in part, on the aggregated sensor data and the supplemental aggregated sensor data.

5. The system of claim 1, wherein the risk score is based on a plurality of scores assigned to a plurality of factors, wherein the plurality of factors comprise an average speed of the vehicle during the window of time, a weather condition during the window of time, a time of day during the window of time, a phone type of the mobile device, and a magnitude of the processed acceleration data at the second time.

6. The system of claim 5, further including instructions that, when executed by the at least one processor, cause the system to:

apply, by the risk determination device, a risk calculation equation aggregating the plurality of scores assigned to the plurality of factors to calculate the risk score.

7. The system of claim 1, further including instructions that, when executed by the at least one processor, cause the system to:

prevent, by the risk feedback generation device, interaction with a user interface of the mobile device responsive to the risk score.

8. A method comprising:

collecting, by a sensor data collection device of a mobile device movement detection system, acceleration data from an accelerometer associated with a mobile device within a vehicle at a first time and at a second time;

collecting, by the sensor data collection device, sensor data from sensors associated with the mobile device, wherein the sensors comprise the accelerometer, a GPS receiver, and a gyroscope;

processing, by a sensor data processing device, the acceleration data to remove a gravity component of the acceleration data, and generating a processed acceleration data at the first time and at the second time;

determining, by a movement event detection device, that a mobile device movement event has occurred at the second time based, at least in part, on three-dimensional vectors representing the processed acceleration data at the first time and at the second time;

aggregating, by a sensor data aggregation device, the sensor data from the sensors associated with the mobile device for a window of time starting at a first predetermined duration before the second time and ending a second predetermined duration after the second time, and generating an aggregated sensor data;

determining, by a risk determination device, a risk score based, at least in part, on the aggregated sensor data for the window of time; and generating, by a risk feedback generation device, a notification to the mobile device based, at least in part, on the risk score.

9. The method of claim 8 wherein determining that a mobile device movement event has occurred at the second time includes:

calculating, by the movement event detection device, a difference in angle between the three-dimensional vectors representing the processed acceleration data at the first time and the second time; and determining, by the movement event detection device, that the difference in angle is greater than a predetermined threshold angle.

10. The method of claim 8 wherein processing the acceleration data to remove the gravity component of the acceleration data includes:

applying, by the sensor data processing device, a low pass filter to the acceleration data at the first time to isolate an acceleration due to gravity at the first time;

removing, by the sensor data processing device, the acceleration due to gravity at the first time from the acceleration data at the first time;

applying, by the sensor data processing device, the low pass filter to the acceleration data at the second time to isolate an acceleration due to gravity at the second time; and removing, by the sensor data processing device, the acceleration due to gravity at the second time from the acceleration data at the second time.

11. The method of claim 8, further comprising:

collecting, by the sensor data collection device, supplemental sensor data from sensors associated with the vehicle during the window of time, and aggregate, by the sensor data aggregation device, to generate an supplemental aggregated sensor data; and determining, by the risk determination device, a risk score based, at least in part, on the aggregated sensor data and the supplemental aggregated sensor data.

12. The method of claim 8, wherein the risk score is based on a plurality of scores assigned to a plurality of factors, wherein the plurality of factors comprise an average speed of the vehicle during the window of time, a weather condition during the window of time, a time of day during the window of time, a phone type of the mobile device, and a magnitude of the processed acceleration data at the second time.

13. The method of claim 12, further comprising:

applying, by the risk determination device, a risk calculation equation aggregating the plurality of scores assigned to the plurality of factors to calculate the risk score.

14. The method of claim 8, further comprising:

preventing, by the risk feedback generation device, interaction with a user interface of the mobile device responsive to the risk score.

15. A computer-assisted method of detecting mobile device movement events comprising:

collecting, by a sensor data collection device of a mobile device movement detection system, acceleration data from an accelerometer associated with a mobile device within a vehicle at a first time and at a second time;

collecting, by the sensor data collection device, sensor data from sensors associated with the mobile device, wherein the sensors comprise the accelerometer, a GPS receiver, and a gyroscope;

processing, by a sensor data processing device, the acceleration data to remove a gravity component of the acceleration data, and generating a processed acceleration data at the first time and at the second time;

determining, by a movement event detection device, that a mobile device movement event has occurred at the second time based, at least in part, on three-dimensional vectors representing the processed acceleration data at the first time and at the second time;

aggregating, by a sensor data aggregation device, the sensor data from the sensors associated with the mobile device for a window of time starting at a first predetermined duration before the second time and ending a second predetermined duration after the second time, and generating an aggregated sensor data;

determining, by a risk determination device, a risk score based, at least in part, on the aggregated sensor data for the window of time; and generating, by a risk feedback generation device, a notification to the mobile device based, at least in part, on the risk score.

16. The computer-assisted method of claim 15 wherein determining that a mobile device movement event has occurred at the second time includes:

calculating, by the movement event detection device, a difference in angle between the three-dimensional vectors representing the processed acceleration data at the first time and the second time; and determining, by the movement event detection device, that the difference in angle in greater than a predetermined threshold angle.

17. The computer-assisted method of claim 15 wherein processing the acceleration data to remove the gravity component of the acceleration data includes:

applying, by the sensor data processing device, a low pass filter to the acceleration data at the first time to isolate an acceleration due to gravity at the first time;

removing, by the sensor data processing device, the acceleration due to gravity at the first time from the acceleration data at the first time;

applying, by the sensor data processing device, the low pass filter to the acceleration data at the second time to isolate an acceleration due to gravity at the second time; and removing, by the sensor data processing device, the acceleration due to gravity at the second time from the acceleration data at the second time.

18. The computer-assisted method of claim 15, wherein the risk score is based on a plurality of scores assigned to a plurality of factors, wherein the plurality of factors comprise an average speed of the vehicle during the window of time, a weather condition during the window of time, a time of day during the window of time, a phone type of the mobile device, and a magnitude of the processed acceleration data at the second time.

19. The computer-assisted method of claim 18 further comprising:

applying, by the risk determination device, a risk calculation equation aggregating the plurality of scores assigned to the plurality of factors to calculate the risk score.

20. The computer-assisted method of claim 15 further comprising:

preventing, by the risk feedback generation device, interaction with a user interface of the mobile device responsive to the risk score.

* * * * *